(12) United States Patent
Liu et al.

(10) Patent No.: US 10,479,943 B1
(45) Date of Patent: Nov. 19, 2019

(54) FLUID CATALYTIC CRACKING PROCESS EMPLOYING A LIPID-CONTAINING FEEDSTOCK

(71) Applicant: Chevron U.S.A. Inc., San Ramon, CA (US)

(72) Inventors: Tengfei Liu, Fairfield, CA (US); Mingting Xu, Walnut Creek, CA (US); Charles Guthrie, Richmond, CA (US); Richard Grove, Spanish Fort, AL (US); Mike Maholland, Park City, UT (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 16/104,410

(22) Filed: Aug. 17, 2018

(51) Int. Cl.
*C10G 3/00* (2006.01)
*C10G 11/18* (2006.01)

(52) U.S. Cl.
CPC ............... *C10G 3/42* (2013.01); *C10G 11/18* (2013.01); *C10G 2300/1011* (2013.01); *C10G 2300/202* (2013.01); *C10G 2400/02* (2013.01); *C10G 2400/04* (2013.01)

(58) Field of Classification Search
None
See application file for complete search history.

(56) References Cited

U.S. PATENT DOCUMENTS

| | | | |
|---|---|---|---|
| 8,207,385 B2 | 6/2012 | O'Connor et al. | |
| 8,524,960 B2 | 9/2013 | O'Connor et al. | |
| 9,109,177 B2 | 8/2015 | Freel et al. | |
| 9,944,859 B2 | 4/2018 | Fjare et al. | |
| 2007/0007176 A1* | 1/2007 | Pinho .................... | C10G 11/05 208/108 |
| 2010/0222620 A1* | 9/2010 | O'Connor ............. | C10G 11/18 585/310 |
| 2014/0316176 A1* | 10/2014 | Fjare ....................... | C10G 3/44 585/240 |
| 2017/0283710 A1 | 10/2017 | Hanks et al. | |

* cited by examiner

*Primary Examiner* — In Suk C Bullock
*Assistant Examiner* — Ali Z Fadhel
(74) *Attorney, Agent, or Firm* — Ryan, Mason & Lewis, LLP

(57) ABSTRACT

Disclosed herein is a method for making diesel, gasoline and LPG comprising coprocessing a petroleum-derived feedstock with up to 50 wt. %, relative to the total weight of the feedstocks, of a lipid-containing feedstock in the presence of a catalyst under fluidized catalyst cracking conditions. Also disclosed herein is a method for making a diesel fuel or a combined diesel and gasoline fuel by injecting up to 50 wt. %, relative to the total weight of the feedstocks, of a lipid-containing feedstock to a stripper or a riser quench downstream from a petroleum derived feedstock injection point in a fluid catalytic cracking unit.

14 Claims, 2 Drawing Sheets

FCC REACTOR AND REGENERATOR
100

FLUID CATALYTIC CRACKING PROCESS EMPLOYING A LIPID-CONTAINING FEEDSTOCK

BACKGROUND

1. Technical Field

The present invention relates generally to a fluid catalytic cracking (FCC) process employing a lipid-containing feedstock.

2. Description of the Related Art

FCC is a technology used in refineries to crack hydrocarbon feeds such as vacuum gas oil (VGO) to hydrocarbon products including diesel, gasoline, liquefied petroleum gas (LPG) and other hydrocarbon fuels. For example, diesel fuel, is a liquid fuel substantially composed of saturated hydrocarbons (primarily paraffins including n- or iso-paraffins, and cycloparaffins) and aromatic hydrocarbons, which are used in diesel engines or heating equipment. Diesel fuel is the fraction or cut of crude oil distilling between 430° F. and 700° F. at atmospheric pressure. Gasoline or naphtha is a liquid fuel that normally boils in the range below 430° F. but boiling above the boiling point of $C_5$ hydrocarbons, and sometimes referred to as a $C_5$ to 430° F. boiling range. LPG generally consists of a blend of $C_3$ to $C_4$ hydrocarbons, i.e., propane, propylene, iso-butane, n-butane and butylenes.

The FCC process uses a reactor called a riser, essentially a pipe, in which a hydrocarbon is contacted with fluidized catalyst particles to accelerate the conversion of the hydrocarbon to more valuable products. For example, the FCC unit can convert gas oil by "cracking" the gas oil molecules into smaller molecules. In general, the catalyst is fluidized in gases such as steam, air or hydrocarbon products and flows like a fluid between FCC reactor and regenerator, hence the term fluid catalytic cracking.

The feedstock entering the riser is heated to the desired cracking temperature because the cracking reactions are endothermic. During the cracking, coke is formed, catalytically or thermally, when the feed is in contact with the hot catalyst entering the riser from the regenerator at temperatures greater than 1250° F. The coke deposits are typically burned with an oxygen source such as air in a regenerator. Burning the coke is an exothermic process that can supply the heat needed for the cracking reactions. In a heat balanced operation, typical of most FCC operations, the quantity of coke formed on the catalyst is significant enough that no external heat source or fuel is needed to supplement the heat from coke combustion.

The high catalyst temperatures (>1250° F.) at the bottom of riser favor the production of dry gas ($C_2$– hydrocarbons, such as hydrogen, methane, ethane and ethylene) and LPG products as compared to the other products such as gasoline and diesel. Accordingly, to obtain hydrocarbon products containing a higher yield of one type of hydrocarbon product over another, for example, diesel and/or gasoline fuel over LPG fuel, there is a need for a process which can produce the specific hydrocarbon product in a higher yield.

SUMMARY

In accordance with a first embodiment of the present invention, there is provided a method for making a fuel comprising coprocessing a petroleum-derived feedstock with up to about 50 wt. %, relative to the total weight of the feedstocks, of a lipid-containing feedstock in the presence of a catalyst under fluidized catalytic cracking conditions.

In accordance with a second embodiment of the present invention, there is provided a method for making a fuel, comprising the step of contacting a reaction feed comprising a first feedstock comprising a petroleum-derived feedstock and up to about 50 wt. %, relative to the total weight of the feedstocks, of a second feedstock comprising a lipid-containing feedstock in the presence of a catalyst under fluidized catalytic cracking conditions, carried out in a fluid catalytic cracking unit, whereby the first feedstock is injected into the fluid catalytic cracking unit at a first injection point, and the second feedstock is injected into the fluid catalytic cracking unit at a second injection point, separate from the first injection point.

In accordance with a third embodiment of the present invention, there is provided a diesel fuel derived from coprocessing a petroleum-derived feedstock with up to 50 wt. %, relative to the total weight of the feedstocks, of a lipid-containing feedstock in the presence of a catalyst under fluidized catalytic cracking conditions.

The present invention is based on the surprising discovery that high yields of diesel, gasoline and LPG can be obtained by coprocessing a petroleum-derived feedstock with up to 50 wt. %, relative to the total weight of the feedstocks, of a lipid-containing feedstock in the presence of a catalyst under fluidized catalytic cracking conditions. In particular, diesel, gasoline and LPG yields can be further improved by injecting lipid-containing feedstock to stripper or riser quench, e.g., at an injecting point downstream of petroleum feedstock injecting point. Advantageously, the lipid-containing feedstock can be introduced to a FCC unit at various locations other than the typical FCC feed (for example, VGO) injection location, e.g., higher diesel and/or gasoline yields can be obtained when injecting the lipid-containing feedstock to a stripper or injecting it through a riser quench.

These and other features, objects and advantages of the present invention will become apparent from the following detailed description of illustrative embodiments thereof, which is to be read in connection with the accompanying drawing.

DETAILED DESCRIPTION

Figure 1:
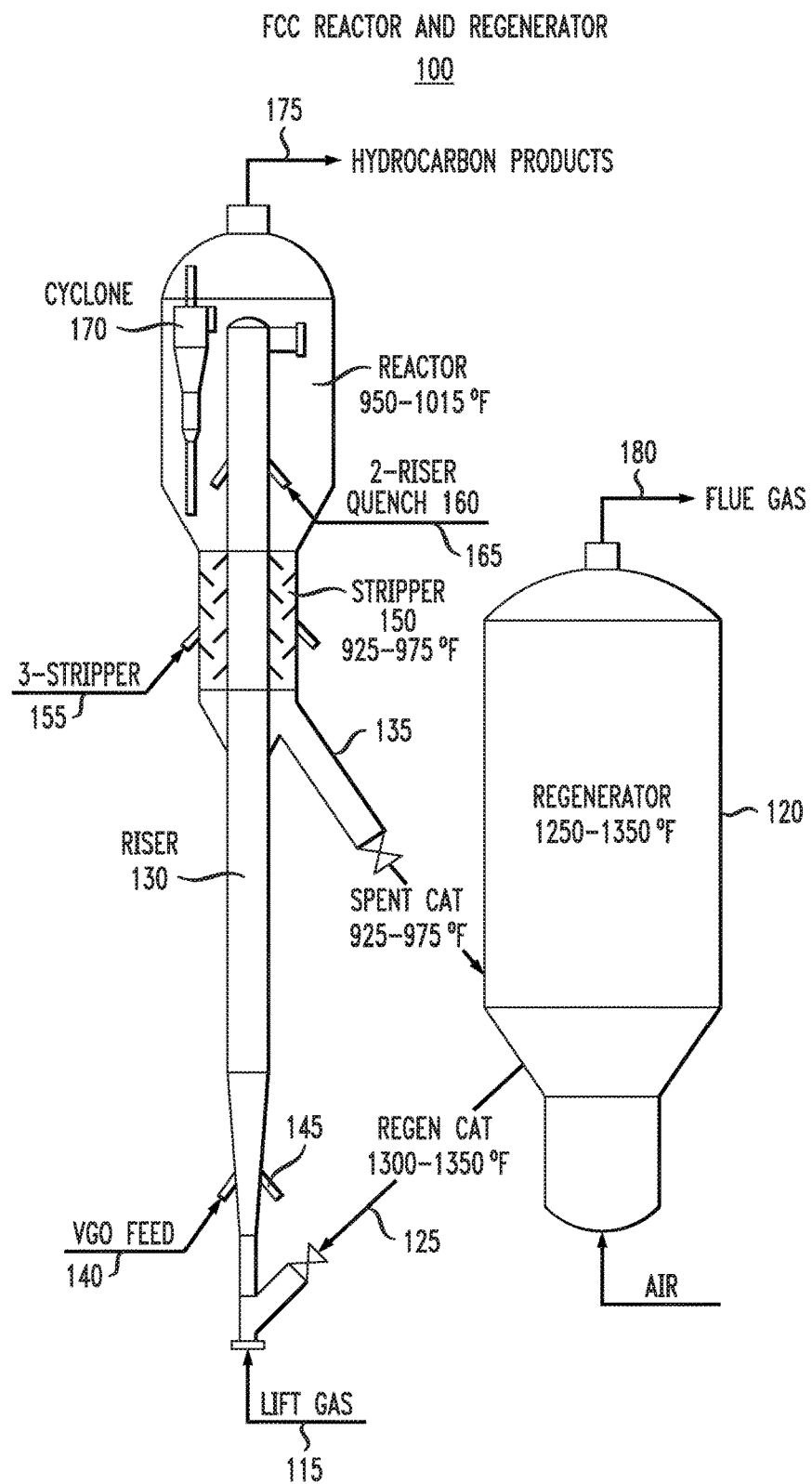
FIG. 1 illustrates a FCC unit, according to an illustrative embodiment.

In one embodiment, a method according to the present invention is derived by coprocessing a petroleum-derived feedstock with up to 50 wt. %, relative to the total weight of the feedstocks (for example, a petroleum-derived feedstock and a lipid-containing feedstock), of a lipid-containing feedstock in the presence of a catalyst under fluidized catalytic cracking conditions. The source of the petroleum-derived feedstock used in coprocessing with the lipid-containing feedstock may be any source wherefrom a hydrocarbon crude may be obtained, produced, refined or the like. The source may be one or more producing wells in fluid communication with a subterranean oil reservoir. The producing well(s) may be under thermal recovery conditions, or the producing well(s) may be in a heavy oil field where the hydrocarbon crude or oil is being produced from a reservoir having a strong water-drive. Alternatively, the source of the petroleum-derived feedstock may be where the petroleum-derived feedstock has been altered during processing.

In one embodiment, the petroleum-derived feedstock includes, for example, any heavy hydrocarbons such as heavy crude oil, heavy hydrocarbons extracted from tar sands, commonly called tar sand bitumen, such as Athabasca tar sand bitumen obtained from Canada, heavy petroleum crude oils such as Venezuelan Orinoco heavy oil belt crudes, Boscan heavy oil, Hamaca crude oil, heavy hydrocarbon fractions obtained from crude petroleum oils, particularly heavy vacuum gas oils, vacuum residuum as well as petroleum tar, tar sands and coal tar. Other examples of heavy hydrocarbon feedstocks which can be used are oil shale, shale, coal liquefaction products and the like.

In another embodiment, the petroleum-derived feedstock includes any processed sample such as heavy cycle gas oil (HCGO), LC Fining products, FCC products and the like.

In another embodiment, the petroleum-derived feedstock comprises a gas oil (GO) feedstock, a vacuum gas oil (VGO) feedstock, a heavy gas oil (HGO) feedstock, a middle distillate feedstock, a heavy-middle distillate feedstock, a hydrocarbon-based feedstock, or combinations thereof.

The present invention further utilizes a lipid-containing feedstock for coprocessing with the petroleum-derived feedstock. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Representative classes of lipids include, for example, fatty acids, glycerol-derived lipids (including fats, oils and phospholipids), sphingosine-derived lipids such as ceramides, cerebrosides, gangliosides, and sphingomyelins, steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

In one illustrative embodiment, a lipid-containing feedstock for use in obtaining a fuel such as diesel fuel according to the present invention comprises primarily triglycerides and free fatty acids (FFAs). The types of triglycerides can be determined according to their fatty acid constituents. For example, the fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis.

In one embodiment, a majority (i.e., greater than about 50%) of the triglyceride present in the lipid-containing feedstock can be comprised of $C_6$ to $C_{24}$ fatty acid constituents, based on total triglyceride present in the lipid-containing feedstock. As one skilled in the art will understand, a triglyceride is a molecule having a structure corresponding to a reaction product of glycerol and three fatty acids, i.e., glycerol fatty acid esters. The glycerol fatty acid esters can be glycerides derived from natural sources such as, for example, beef tallow oil, lard oil, palm oil, castor oil, cottonseed oil, corn oil, peanut oil, soybean oil, sunflower oil, olive oil, whale oil, menhaden oil, sardine oil, coconut oil, palm kernel oil, babassu oil, rape oil, soya oil and the like.

In one embodiment, the glycerol fatty acid esters will contain from about $C_4$ to about $C_{75}$ or from about $C_6$ to about $C_{24}$ fatty acid esters, i.e., several fatty acid moieties, the number and type varying with the source of the oil. Fatty acids are a class of compounds containing a long hydrocarbon chain and a terminal carboxylate group and are characterized as unsaturated or saturated depending upon whether a double bond is present in the hydrocarbon chain. Therefore, an unsaturated fatty acid has at least one double bond in its hydrocarbon chain whereas a saturated fatty acid has no double bonds in its fatty acid chain. In one embodiment, the acid is saturated. Suitable unsaturated fatty acids include, for example, myristoleic acid, palmitoleic acid, oleic acid, linolenic acid, and the like. Suitable saturated fatty acids include, for example, caproic acid, caprylic acid, capric acid, lauric acid, myristic acid, palmitic acid, stearic acid, arachidic acid, behenic acid, lignoceric acid, and the like. The acid moiety may be supplied in a fully esterified compound or one which is less than fully esterfied, e.g., glyceryl tri-stearate, or glyceryl di-laurate and glyceryl mono-oleate, respectively.

In one illustrative embodiment, a lipid-containing feedstock for use in the method according to the present invention comprises one or more vegetable or plant oils. Suitable vegetable or plant oils include, for example, rapeseed (canola) oil, rapeseed oil, cottonseed oil, sesame oil, nut oils, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, rice bran oil and algae oil. Vegetable oils for use herein can also include processed vegetable oil material. Suitable processed vegetable oil material includes, for example, fatty acids and fatty acid alkyl esters. Alkyl esters typically include $C_1$ to $C_5$ alkyl esters such as methyl, ethyl, and propyl esters.

Algae oils or lipids can typically be contained in algae in the form of membrane components, storage products, and/or metabolites. Certain algal strains, particularly microalgae such as diatoms and cyanobacteria, can contain proportionally high levels of lipids. In one embodiment, algal sources for the algae oils can contain varying amounts, e.g., from about 2 wt. % to about 40 wt. % of lipids, based on total weight of the lipid biomass itself.

Suitable algal sources for algae oils can include, for example, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Representative species include, for example, *Neochloris oleoabundans, Scenedesmus dimorphus, Euglena gracilis, Phaeodactylum tricornutum, Pleurochrysis carterae, Prymnesium parvum, Tetraselmis chuff*, and *Chlamydomonas reinhardtii*. Additional or alternate algal sources can include, for example, one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia,*

*Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella,* and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsi s, Chroococcidiopsi s, Chroococcus, Crinalium, Cyanobacterium, Cyanobium, Cyanocystis, Cyanospira, Cyanothece, Cylindrospermopsis, Cylindrospermum, Dactyl ococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema,* and *Xenococcus* species.

In one illustrative embodiment, a lipid-containing feedstock for use in the method according to the present invention comprises one or more animal fats. Suitable animal fats include, for example, beef fat (tallow), hog fat (lard), turkey fat, duck fat, chicken fat, fish fat/oil, and shark oil. The animal fats can be obtained from any suitable source including, for example, restaurants and meat production facilities.

Animal fats for use herein can also include processed animal fat material. Suitable processed animal fat material includes, for example, fatty acids and fatty acid alkyl esters. Alkyl esters typically include $C_1$ to $C_5$ alkyl esters such as methyl, ethyl, and propyl esters.

As will be further described below in accordance with FIG. 1, an amount of up to about 50 wt. %, based on the total weight of the feed, of the lipid-containing feedstock may be blended either in combination with the petroleum-derived feedstock, as in a mixed feed stream or as a separate feed stream either before, after, or before and after the introduction of the petroleum-derived feedstock. Alternatively, the petroleum-derived feedstock may be introduced jointly with an amount of up to about 50 wt. %, based on the total weight of the feed, of the lipid-containing feedstock, before, after, or before and after the introduction of the lipid-containing feedstock.

In illustrative embodiments, the method may include introducing, injecting, feeding, or co-feeding the petroleum-derived feedstock, the lipid-containing feedstock, or combinations thereof into a refinery system via a mixing zone, a nozzle, a retro-fitted port, a retro-fitted nozzle, a velocity steam line, or a live-tap. For example, the method may comprise coprocessing the petroleum-derived feedstock with the lipid-containing feedstock. In other illustrative embodiments, the coprocessing may comprise co-injecting the petroleum-derived feedstock and the lipid-containing feedstock, such as co-feeding, independently or separately introducing, injecting, feeding, or co-feeding, the petroleum-derived feedstock and the lipid-containing feedstock into a fluidized catalytic cracking unit. For example, the petroleum-derived feedstock and the lipid-containing feedstock may be provided, introduced, injected, fed, or co-fed proximate to each other into the reactor, reaction zone, reaction riser, stripper or riser quench of a fluidized catalytic cracking unit.

In illustrative embodiments, the lipid-containing feedstock may be provided, introduced, injected, fed, or co-fed into the reactor, reaction zone, reaction riser, stripper or riser quench of the fluidized catalytic cracking unit proximate, upstream, or downstream to the delivery or injection point of the petroleum-derived feedstock. In illustrative embodiments, the petroleum-derived feedstock and the lipid-containing feedstock come in contact with each other upon introduction, delivery, injection, feeding, or co-feeding into the reactor, into the reaction zone, or into the reaction riser of the fluidized catalytic cracking unit. In illustrative embodiments, the petroleum-derived feedstock and the lipid-containing feedstock come in contact with each other subsequent to entering the reactor, the reaction zone, or the reaction riser of the fluidized catalytic cracking unit. In illustrative embodiments, the petroleum-derived feedstock and the lipid-containing feedstock make first contact with each other subsequent to entering into, introduction into, injection into, feeding into, or co-feeding into the reactor, the reaction zone, or the reaction riser of the fluidized catalytic cracking unit. In illustrative embodiments, the petroleum-derived feedstock and the lipid-containing feedstock are co-blended prior to injection into the fluidized catalytic cracking unit.

The petroleum-derived feedstock and the lipid-containing feedstock may be introduced into the fluidized catalytic cracking unit through different or similar delivery systems. For example, the petroleum-derived feedstock and the lipid-containing feedstock may be introduced into the fluidized catalytic cracking unit through one or more independent or separate injection nozzles. The petroleum-derived feedstock and the lipid-containing feedstock may be introduced into the fluidized catalytic cracking unit proximate or near to each other in a FCC reactor riser in the fluidized catalytic cracking unit. The lipid-containing feedstock may be introduced into the fluidized catalytic cracking unit above, below, near, or proximate the introduction point of the petroleum-derived feedstock in the fluidized catalytic cracking unit. In certain embodiments, one or more injection nozzles may be located in a FCC reactor riser in the fluidized catalytic cracking unit suitable for introducing the petroleum-derived feedstock or the lipid-containing feedstock. For example, the lipid-containing feedstock may be introduced into the fluidized catalytic cracking unit through a lift steam line located at the bottom of the FCC reactor riser.

In illustrative embodiments, the petroleum-derived feedstock may be introduced into the fluidized catalytic cracking unit at a first injection point and the lipid-containing feedstock may be introduced into the fluidized catalytic cracking unit at a second injection point. For example, the first injection point may be upstream of the second injection point. In one embodiment, the first injection point may be downstream of the second injection point. In one embodiment, the first injection point may be proximate to the second injection point. In one embodiment, the first injection point and the second injection point may be located in a FCC reactor riser.

In illustrative embodiments, a lipid-containing feedstock may be introduced downstream from a reactor riser in the fluidized catalytic cracking unit, such as a FCC reactor stripper, during conversion of the petroleum-derived feedstock. For example, a lipid-containing feedstock may be injected via a stripper system downstream from the introduction point of the petroleum-derived feedstock in the fluidized catalytic cracking unit. In certain embodiments, a lipid-containing feedstock may be injected via a strip system a petroleum-derived feedstock injection nozzle.

In illustrative embodiments, a lipid-containing feedstock may be introduced downstream from a reactor riser in the fluidized catalytic cracking unit, such as a FCC riser quench, during conversion of the petroleum-derived feedstock. For example, a lipid-containing feedstock may be injected via a quench riser system downstream from the introduction point of the petroleum-derived feedstock. In illustrative embodiments, a lipid-containing feedstock may be injected via a quench riser system located downstream of a petroleum-derived feedstock injection nozzle in the fluidized catalytic cracking unit.

In certain embodiments, a lipid-containing feedstock may be introduced into a fluidized catalytic cracking unit in an amount of up to about 50 wt. %, based on the total weight of the feed, e.g., a range of between about 0.05 wt. % and 50 wt. %, relative to the amount of a petroleum-derived feedstock introduced. In one embodiment, a lipid-containing feedstock may be introduced into fluidized catalytic cracking unit 100 in an amount of from about 0.05 wt. % to about 25 wt. %, relative to the amount of a petroleum-derived feedstock introduced. In one embodiment, a lipid-containing feedstock may be introduced into fluidized catalytic cracking unit 100 in an amount of from about 25 wt. % to about 50 wt. %, relative to the amount of a petroleum-derived feedstock introduced.

In certain embodiments, the weight ratio of the total amount of petroleum-derived feedstock and lipid-containing feedstock introduced into fluidized catalytic cracking unit to the amount of catalyst utilized, or the total amount of the combined petroleum-derived feedstock and lipid-containing feedstock introduced into fluidized catalytic cracking unit that contacts the catalyst utilized in the system (sometimes referred to as a "catalyst-to-oil ratio" or "catalyst:oil ratio") may be in the range of between about 3 to about 8. In one embodiment, the catalyst-to-oil ratio may be in the range of between about 8 to about 13.

The catalyst that can be used herein can be any known catalyst for use in a fluidized catalytic cracking unit. Suitable catalysts include, for example, FCC catalysts which generally comprise a zeolite. In one embodiment, the zeolites include faujasite, ZSM-5 or any combinations thereof. In an embodiment, the zeolites are dispersed on a matrix. The crystalline molecular sieve may have any suitable pore size. In some embodiments, the zeolites are small or medium pore zeolites with an effective pore diameter from about 0.2 nm to about 0.8 nm, alternatively from about 0.5 nm to about 0.8 nm and defined by about 10 to 12 rings. Pore size indices are from about 0.6 to about 30.

FIG. 1 illustrates fluidized catalytic cracking unit 100 of the present invention including a fluidized catalytic cracking reactor 110 and regenerator 120. It is to be understood that fluid catalytic cracking unit 100 is not limited to the configuration of the embodiments shown in FIG. 1. In general, the fluidized catalytic cracking unit 100 depicts where the lipid-containing feedstock could be introduced into the unit. As discussed above, the fluidized catalytic cracking unit can be designed to have two or more feedstock injection points, namely, at least one for the petroleum-derived feedstock and at least one for the lipid-containing feedstock or these feedstocks could be co-injected (by having them mixed upstream of the injection point) or the fluidized catalytic cracking unit could be fitted with multiple points of injection for either, both or mixtures of the feedstocks. For example, the petroleum-derived feedstock and the lipid-containing feedstock may be introduced into fluidized catalytic cracking unit 100 through different or similar delivery systems. In one embodiment, the petroleum-derived feedstock and the lipid-containing feedstock may be introduced into fluidized catalytic cracking unit 100 through one or more independent or separate injection nozzles. The petroleum-derived feedstock and the lipid-containing feedstock may be introduced into the system proximate or near to each other in FCC reactor riser 130 in fluidized catalytic cracking unit 100, such as through injection nozzles 140 and 145. The lipid-containing feedstock may be introduced into fluidized catalytic cracking unit 100 above, below, near, or proximate the introduction point 140 of the petroleum-derived feedstock in fluidized catalytic cracking unit 100. In certain embodiments, the lipid-containing feedstock may be introduced into fluidized catalytic cracking unit 100 through a lift steam line located at the bottom of FCC reactor riser 130.

In certain embodiments, the petroleum-derived feedstock may be introduced into fluidized catalytic cracking unit 100 at a first injection point and the lipid-containing feedstock may be introduced into the system at a second injection point. For example, in one embodiment, the first injection point may be upstream of the second injection point, or the first injection point may be downstream of the second injection point, or the first injection point may be proximate to the second injection point, or the first injection point and the second injection point may be located in FCC reactor riser 130. In certain embodiments, a lipid-containing feedstock may be introduced below a reactor riser, such as FCC reactor riser 130, during conversion of the petroleum-derived feedstock.

In one embodiment, the petroleum-derived feedstock can be injected into FCC reactor riser 130 with the catalyst from regenerator 120 and subjected to fluidized catalytic cracking conditions, e.g., a temperature of from about 900° F. to about 1050° F., a pressure of from about 16 psia to about 40 psia, and for a time period ranging from about 1 to about 4 s. For example, the petroleum-derived feedstock can be heated within FCC reactor riser 130 to a temperature of about 900° F. to about 1050° F. In general, the catalyst flowing from regenerator 120 via line 125 is a hot catalyst, e.g., having a temperature greater than about 1200° F. such as from about 1250° F. to about 1350° F.

Steam and/or other lift gas via line 115, the petroleum-derived feedstock via line 140, and one or more catalysts via line 125 can be introduced to FCC reactor riser 130, forming a fluidized mixture ("reaction mixture") therein. The steam via line 115 and the catalyst via line 125 can be introduced separately to FCC reactor riser 130. Alternatively, the steam and the catalyst can be mixed and introduced together as a mixture to FCC reactor riser 130. In another example, the steam and the petroleum-derived feedstock can be mixed and introduced together as a mixture to FCC reactor riser 130.

The velocity of the reaction mixture flowing through FCC reactor riser 130 can be from about 50 feet/second to about 150 feet/second. The residence time of the reaction mixture in the reaction riser 130 can be from about 1 second to about 3 seconds.

The petroleum-derived feedstock in line 140 is vaporized when contacting with hot regenerated catalyst flowing from line 125 via a slide valve. Within FCC reactor riser 130, the pressure can be adjusted indirectly by adjusting the pressure in the main fractionator downstream reactor mix and temperature can be adjusted by adjusting the slide valve.

The steam introduced via line 115 to FCC reactor riser 130 can be saturated. The pressure of the saturated steam can be from about 40 psi to about 150 psi. Alternatively, the steam introduced via line 115 to FCC reactor riser 130 can be superheated. The pressure of the superheated steam can be from a low of about 40 psi to a high of about 150 psi. The temperature of the superheated steam via line 115 can be about 300° F. to about 500° F.

Within FCC reactor riser 130, the petroleum-derived feedstock within the reaction mixture can be cracked to provide a riser effluent, i.e., hydrocarbon products, via the transfer line 175 which will be sent to the main fractionator (not shown). At least a portion of the hydrocarbon byproducts present in FCC reactor riser 130 can deposit on the surface of the catalyst particulates, forming coked-catalyst particulates or spent catalyst. Thus, the riser effluent exiting FCC reactor riser 130 can include coked-catalyst particulates, gaseous hydrocarbons, carbon dust or particulates, steam, and inerts.

Cracking reactions begin as soon as the petroleum-derived feedstock is vaporized by the hot regenerated catalyst. The expanding volume of the vapors is the main driving force to carry the catalyst up the riser. The petroleum-derived feedstock introduced via line 140 to FCC reactor riser 130 can react in the presence of the catalyst in the reaction riser 130 to produce a hydrocarbon product. For example, the petroleum-derived feedstock can react in the presence of the catalyst to produce diesel, gasoline, LPG, jet fuel and the like. As one skilled in the art will understand, since the temperature of the hot catalyst entering FCC reactor riser 130 is greater than 1250° F., the hydrocarbon product will contain a greater amount of gasoline than the other hydrocarbon products when the petroleum-derived feedstock is, for example, a VGO feedstock.

Once the petroleum-derived feedstock has been cracked, the effluent containing hydrocarbon products (i.e., cracked products) such as diesel, gasoline and other by-products will be sent to separator 170 (cyclones) where the coked-catalyst particulates and/or other particulates can be separated from the gaseous hydrocarbons and steam via centrifugal force. Used catalyst and unstripped hydrocarbons will fall to stripper 150. Lipid-containing feedstock can be injected to stripper 150 via injection nozzle 155, or to riser quench via injection nozzle 160 and injection nozzle 165 or via other dedicated nozzles.

The gaseous hydrocarbons ("cracked product") via line 175 can be recovered from the separator (cyclone) 170. The hydrocarbon product mixture via line 175 can be further separated in a fractionation tower (not shown) to provide one or more finished products. For example, the product via line 175 can be introduced to a fractionation tower (not shown) that quenches the product and separates entrained catalyst particulates therefrom. Entrained catalyst particulates separated from the cracked product can then be recycled back to FCC reactor riser 130 or to regenerator 120.

In one embodiment, the lipid-containing feedstock is also injected into FCC reactor riser 130, either separately or as a blend with the petroleum-derived feedstock and cracked with the petroleum-derived feedstock and catalyst.

The solids, i.e., coked-catalyst particulates, can free fall through the separator (cyclone) 170 and can be introduced via line 135 to regenerator 120. Although not shown, at least a portion of the solids can be introduced to the regenerator after passing through a stripper. The coked-catalyst particulates introduced via line 135 can be combined with one or more fluids (not shown) within the regenerator 120 to provide a flue gas via line 180 and regenerated catalyst via line 125. The one or more fluids can include one or more oxidants and/or supplemental fuel. Illustrative oxidants can include, but are not limited to, air, oxygen, oxygen, oxygen-enriched air, ozone, hydrogen peroxide, an essentially nitrogen-free oxidant, or any combination thereof. As used herein, the term "essentially oxygen" refers to a fluid containing more than 50 vol % oxygen. As used herein, the term "oxygen-enriched air" refers to a fluid containing about 21 vol % oxygen to about 50 vol % oxygen. Oxygen-enriched air and/or essentially oxygen can be obtained, for example, from cryogenic distillation of air, pressure swing adsorption, membrane separation, or any combination thereof.

As used herein, the term "essentially nitrogen-free," refers to an oxidant that contains about 5 vol % nitrogen or less, about 4 vol % nitrogen or less, about 3 vol % nitrogen or less, about 2 vol % nitrogen or less, or about 1 vol % nitrogen or less. The supplemental fuel can include any combustible material. For example, the supplemental fuel can include $C_1$ to $C_{20}$ hydrocarbons and/or carbon. The regenerated catalyst particulates can be recovered via line 125, which can be recycled to FCC reactor riser 130. In one or more embodiments, fresh, unused, catalyst can be added (not shown) to regenerator 120, the regenerated catalyst in line 125, and/or to FCC reactor riser 130.

In one embodiment, a lipid-containing feedstock may be injected via injection nozzle 155 in stripper 150, downstream, or proximate, from the introduction point of the petroleum-derived feedstock. The lipid-containing feedstock and used catalyst from FCC reactor riser 130 are contacted in stripper 150 under fluidized catalytic cracking conditions, e.g., at a temperature ranging from about 880° F. to about 1000° F., and a pressure from about 14 psia to about 40 psia, to deoxygenate the lipid-containing feedstock. In one embodiment, the lipid-containing feedstock and spent catalyst are contacted in stripper 150 at a temperature ranging from about 880° F. to about 1000° F. and a pressure from about 14 psia to about 40 psia. The time period for contacting the lipid-containing feedstock and spent catalyst and optional petroleum-derived feedstock in stripper 150 can range from about 30 seconds to about 5 minutes. In one embodiment, the lipid-containing feedstock and used catalyst are contacted in stripper 150 for a time period ranging from about 1 min to about 5 minutes.

As discussed above, the lipid-containing feedstock and used catalyst are contacted in stripper 150 such that the lipid-containing feedstock is deoxygenated and cracked to hydrocarbons, and the hydrocarbons are sent via separator (cyclone) 170 to be combined with the cracked product from petroleum derived feedstock from FCC reactor riser 130. In one embodiment, the lipid-containing feedstock and used catalyst are contacted in stripper 150 under fluidized catalytic cracking conditions such that the lipid-containing feedstock is cracked into diesel fuel, and then the diesel fuel is sent via line 175 to be combined with the cracked hydrocarbon product to provide a product having a higher yield of diesel fuel.

In one embodiment, a lipid-containing feedstock may be injected via injection nozzle 165 in riser quench system 160 downstream from the introduction point of the petroleum-derived feedstock. The lipid-containing feedstock and used catalyst are contacted in riser quench 160 under fluidized catalytic cracking conditions, e.g., at a temperature ranging from about 920° F. to about 1050° F. and a pressure from about 14 psia to about 50 psia, to deoxygenate the lipid-containing feedstock. In one embodiment, the lipid-containing feedstock and catalyst are contacted in riser quench 160 at a temperature ranging from about 920° F. to about 1050° F. and a pressure from about 14 psia to about 50 psia. The time period for contacting the lipid-containing feedstock and used catalyst in riser quench 160 can range from about 0.1 seconds to about 3 seconds. In one embodiment, the lipid-containing feedstock and used catalyst are contacted in riser quench system 160 for a time period ranging from about 0.1 seconds to about 2 seconds.

As discussed above, the lipid-containing feedstock and used catalyst are contacted in riser quench 160 such that the lipid-containing feedstock is deoxygenated and cracked, and then the deoxygenated and cracked lipid-containing feedstock is sent via separator (cyclone) 170 to be combined with the other cracked hydrocarbon products. In one embodiment, the lipid-containing feedstock and catalyst are contacted in riser quench 160 under fluidized catalytic cracking conditions such that the lipid-containing feedstock is cracked into diesel fuel, and then the diesel fuel is sent via line 175 to be combined with the cracked hydrocarbon product to provide a product having a higher yield of diesel fuel.

After the petroleum-derived feedstock and lipid-containing feedstock have been subjected to fluidized catalytic cracking conditions, the effluent from the reaction system has a variety of products including, for example, diesel fuel having a boiling range in the diesel range, gasoline having a boiling range in the gasoline range, jet fuel having a boiling range in the jet range, LPG and the like and mixtures thereof. After the reaction has taken place, the reaction product can be fed to a separation unit (i.e., distillation column and the like) in order to separate the diesel, from other products. Un-reacted product may be recycled to the reaction system for further processing to maximize diesel production.

The following non-limiting examples are illustrative of the present invention.

Figure 2:
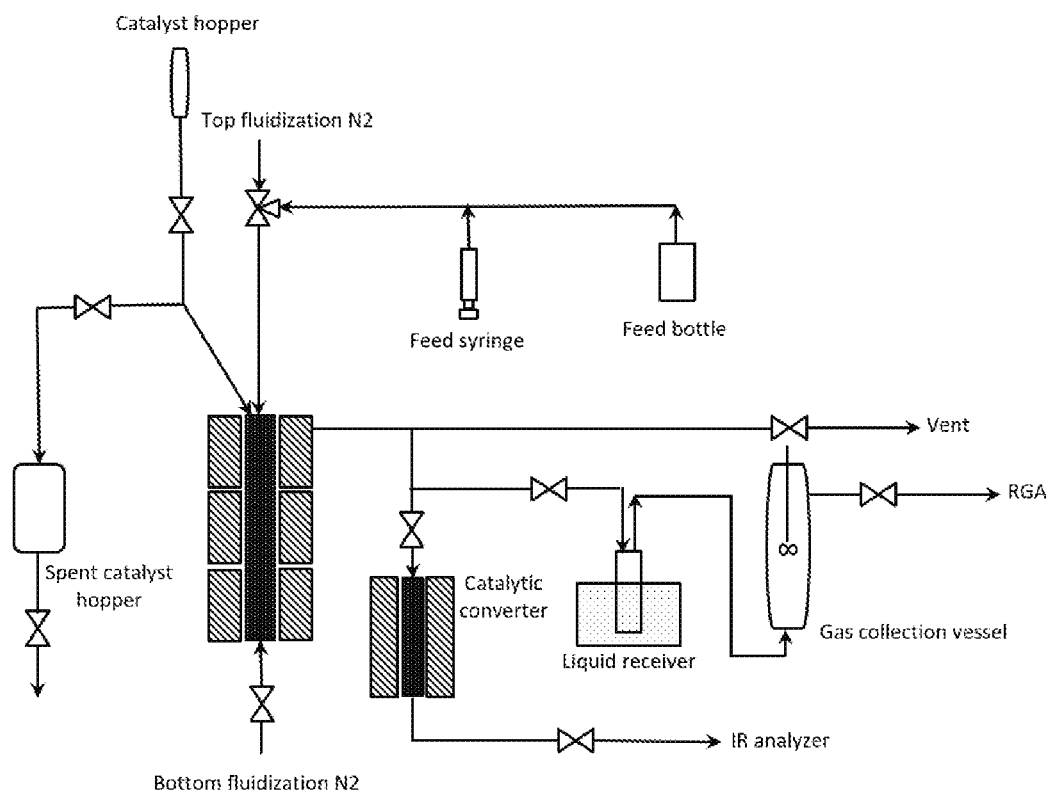
FIG. 2 illustrates a schematic diagram for the experimental setup in the example section, according to an illustrative embodiment.

A series of laboratory tests were carried out to study lipids cracking under FCC conditions. The lipid used was canola oil. The catalysts were regenerated equilibrium catalyst (Ecat) and pre-coked Ecat catalyst obtained from a FCC unit. The pre-coked Ecat was prepared by cracking an internal standard vacuum gas oil (VGO) on the regenerated Ecat at 1015° F. at catalyst to oil ratio of 5:1. The coke on the pre-coked Ecat catalyst was around 0.9 wt. % versus 0.08 wt. % coke on the regenerated Ecat. The experiments for catalytic cracking of canola oil were carried out on a Model C ACE (advanced cracking evaluation) unit fabricated by Kayser Technology Inc. (Texas, USA). A schematic diagram of the experimental setup is shown in FIG. 2. The reactor employed in the ACE unit was a fixed fluidized reactor using $N_2$ as fluidization gas. The catalytic cracking of canola oil was carried out at atmospheric pressure and temperatures at 850° F., 900° F. and 950° F. For each experiment a constant amount of 1.5-gram canola oil was injected at the rate of 1.2 gram/min for 75 seconds. The cat/oil ratio, between 5 to 8, was varied by varying the amount of catalyst. After 75 seconds of feed injection, the catalyst was stripped off by nitrogen for a period of 525 seconds.

During the catalytic cracking and stripping process, the liquid product was collected in a sample vial attached to a glass receiver, which was located at the end of the reactor exit and was maintained at −15° C. The gaseous products were collected in a closed stainless-steel vessel (12.6 L) prefilled with $N_2$ at 1 atm. Gaseous products were mixed by an electrical agitator rotating at 60 rpm as soon as feed injection was completed. After stripping, the gas products were further mixed for 10 mins to ensure homogeneity. The final gas products were analyzed using a refinery gas analyzer (RGA).

After the completion of stripping process, the in-situ catalyst regeneration was carried out in the presence of air at 1300° F. The regeneration flue gas passed through a catalytic converter packed with CuO pellets (LECO Inc.) to oxidize CO to $CO_2$. The flue gas was then analyzed by an online IR analyzer located downstream the catalytic converter. Coke deposited during cracking process was calculated from the $CO_2$ concentrations measured by the IR analyzer.

As mentioned above, gaseous products, mainly $C_1$ through $C_7$ hydrocarbons, were resolved in a RGA. The RGA is a customized Agilent 7890B GC equipped with three detectors, a flame ionization detector (FID) for hydrocarbons and two thermal conductivity detectors for nitrogen and hydrogen. A methanizer was also installed on the RGA to quantify trace amount of CO and CO2 when biofuels were injected. Gas products were grouped into dry gas ($C_2$ hydrocarbons and hydrogen), LPG ($C_3$ and $C_4$ hydrocarbons). CO and $CO_2$ were excluded from dry gas. Their yields were reported separately. Liquid products were weighed and analyzed in a simulated distillation GC (Agilent 6890) using ASTM D2887 method. The liquid products were cut into gasoline ($C_5$–430° F.), LCO (430° F. to 650° F.) and HCO (650° F.+). Gasoline ($C_5$+ hydrocarbons) in the gaseous products were combined with gasoline in the liquid products as total gasoline. Light ends in the liquid products ($C_5$−) were also subtracted from liquid products and added back to $C_3$ and $C_4$ species using some empirical distributions. Material balances were between 98% and 101% for most experiments.

The results of the experiments are set forth below in Table 1.

TABLE 1

|  | Regen Ecat 950° F. | Coked Ecat 950° F. | Regen Ecat 900° F. | Coked Ecat 900° F. | Regen Ecat 850° F. | Coked Ecat 850° F. |
| --- | --- | --- | --- | --- | --- | --- |
| Cat/Oil, wt/wt | 6.5 | 6.5 | 6.5 | 6.5 | 6.5 | 6.5 |
| Yield, wt. % | | | | | | |
| Conversion | 83.21 | 81.16 | 80.96 | 79.18 | 77.96 | 75.76 |
| Coke | 6.58 | 4.19 | 6.84 | 4.65 | 7.78 | 6.06 |
| Dry gas | 2.15 | 1.95 | 1.55 | 1.33 | 1.05 | 0.91 |
| Propane | 1.46 | 1.24 | 1.22 | 0.97 | 0.91 | 0.72 |
| Propylene | 5.84 | 5.56 | 4.90 | 4.65 | 3.97 | 3.81 |
| nButane | 1.01 | 0.87 | 0.89 | 0.72 | 0.71 | 0.56 |
| iButane | 4.18 | 3.39 | 3.78 | 3.12 | 3.18 | 2.62 |
| C4 Olefins | 4.88 | 5.06 | 4.09 | 4.20 | 3.33 | 3.45 |
| LPG | 17.38 | 16.12 | 14.88 | 13.66 | 12.10 | 11.15 |
| Gasoline | 44.94 | 46.71 | 45.44 | 47.36 | 44.98 | 45.37 |
| Diesel | 13.18 | 14.75 | 14.91 | 16.29 | 17.01 | 18.71 |
| HCO | 3.61 | 4.09 | 4.13 | 4.53 | 5.03 | 5.53 |

As can be seen, at the same cracking temperature, the diesel yield was higher on the pre-coked Ecat, which has lower activity than on regenerated Ecat. The activity is shown as conversion in the table. Accordingly, the pre-coked (spent) Ecat, conversions are almost 2 wt. % lower while diesel are 1.5 wt. % higher as compared to the regenerated Ecat at each of the tested temperatures.

Diesel yield is higher at the lower tested temperatures than at the higher tested temperatures. For example, on the regenerated Ecat, diesel yield increased from 13.18 at 950° F. to 14.91 at 900° F. and further increased to 17.01 at 850° F. while on the pre-coked Ecat, diesel yield increased from 14.75 at 950° F. to 16.29 at 900° F. and further increased to 18.71 at 850° F.

Gasoline is an intermediate product in FCC. In general, as reaction severity increased, for example, increasing temperature or catalyst activity, gasoline yield initially increases, passing an optimal point and then decreases at high severity. As can be seen in Table 1, gasoline yield was the highest on pre-coked Ecat at 900° F. In addition, gasoline and diesel combined yield was highest on pre-coked Ecat at 850° F.

Based on the above testing results, it is believed that when injecting lipids to locations that have lower temperature and/or lower catalyst activity, the diesel, or the combined diesel and gasoline yields will be higher. In a FCC unit, locations in stripper 150 and riser quench 165 have lower temperature and lower catalyst activity than in FCC reactor riser 130, or to be more specific, near the bottom of riser, where both temperature and catalyst activity are much higher.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method for making a diesel fuel comprising coprocessing a petroleum-derived feedstock with up to 50 wt. %, relative to the total weight of the feedstocks, of a lipid-containing feedstock in the presence of a catalyst under fluidized catalytic cracking conditions to obtain the diesel fuel;
    wherein the fluidized catalytic cracking conditions comprise a temperature of from about 920° F. to about 1050° F. a pressure of from about 14 psia to about 50 psia, and for a time period ranging from about 0.1 second to about 3 seconds;
    wherein the coprocessing is carried out in a fluid catalytic cracking unit;
    wherein the petroleum-derived feedstock is injected into the fluid catalytic cracking unit at a first injection point, and the lipid-containing feedstock is injected into the fluid catalytic cracking unit at a second injection point, separate from the first injection point; and
    wherein the fluid catalytic cracking unit comprises a riser reactor and a riser quench, and the second injection point flows into the riser quench.

2. The method of claim 1, wherein the petroleum-derived feedstock comprises a vacuum gas oil.

3. The method of claim 1, wherein the lipid-containing feedstock comprises a material selected from the group consisting of triglycerides, diglycerides, monoglycerides, fatty acids and mixtures thereof.

4. The method of claim 1, wherein the lipid-containing feedstock comprises a material selected from the group consisting of animal fat, vegetable oil, algae lipids, and mixtures thereof.

5. The method of claim 1, comprising coprocessing the petroleum-derived feedstock with about 0.05 wt. % to about 50 wt. %, relative to the total weight of the feedstocks, of the lipid-containing feedstock.

6. The method of claim 1, wherein the catalyst is a fluid catalytic cracking catalyst.

7. The method of claim 1, wherein the catalyst is used catalyst.

8. A method for making a fuel comprising:
    coprocessing, in a fluid catalytic cracking unit, a petroleum-derived feedstock with up to 50 wt. %, based on the total weight of the feedstocks, of a lipid-containing feedstock in the presence of a catalyst under fluidized catalytic cracking conditions to obtain the fuel;
    wherein the fluid catalytic cracking unit comprises a riser reactor and a stripper;
    wherein the petroleum-derived feedstock is injected into the fluid catalytic cracking unit at a first injection point, and the lipid-containing feedstock is injected into the fluid catalytic cracking unit at a second injection point, separate from the first injection point, and wherein the second injection point flows into the stripper; and
    wherein the lipid-containing feedstock is contacted with the catalyst in the stripper under fluidized catalyst cracking conditions comprising a temperature of from about 880° F. to about 1000° F., at a pressure from about 14 psia to about 40 psia, and for a time period ranging from about 30 second to about 5 minutes.

9. The method of claim 8, wherein the petroleum-derived feedstock comprises a vacuum gas oil.

10. The method of claim 8, wherein the lipid-containing feedstock comprises a material selected from the group consisting of triglycerides, diglycerides, monoglycerides, fatty acids and mixtures thereof.

11. The method of claim 8, wherein the lipid-containing feedstock comprises a material selected from the group consisting of animal fat, vegetable oil, algae lipids, and mixtures thereof.

12. The method of claim 8, comprising coprocessing the petroleum-derived feedstock with about 0.05 wt. % to about 50 wt. %, relative to the total weight of the feedstocks, of the lipid-containing feedstock.

13. The method of claim 8, wherein the catalyst is a fluid catalytic cracking catalyst.

14. The method of claim 8, wherein the catalyst is used catalyst.

* * * * *